July 28, 1931. R. SHUYLER 1,816,236
APPARATUS FOR COOLING AND CONDITIONING GRAIN
Filed Jan. 28, 1929 2 Sheets-Sheet 1

INVENTOR,
Reynold Shuyler.
BY
ATTORNEY.

July 28, 1931. R. SHUYLER 1,816,236
APPARATUS FOR COOLING AND CONDITIONING GRAIN
Filed Jan. 28, 1929 2 Sheets-Sheet 2
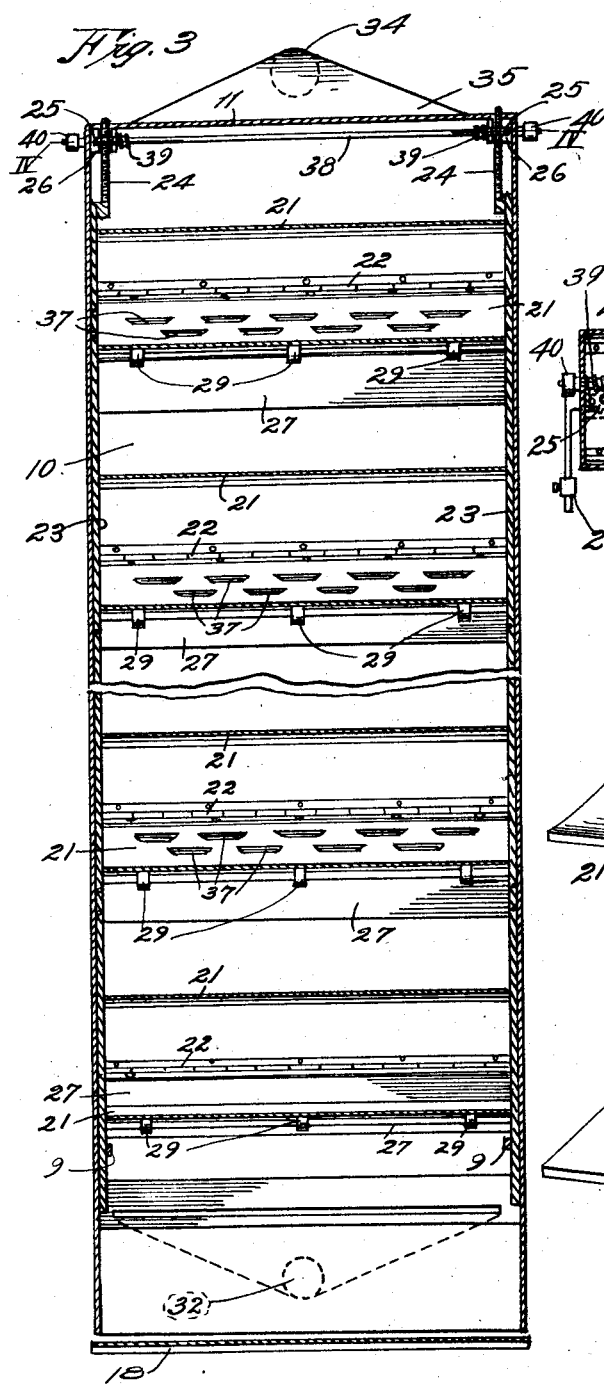
INVENTOR,
Reynold Shuyler.
BY
ATTORNEY.

Patented July 28, 1931

1,816,236

UNITED STATES PATENT OFFICE

REYNOLD SHUYLER, OF BETHEL, KANSAS

APPARATUS FOR COOLING AND CONDITIONING GRAIN

Application filed January 28, 1929. Serial No. 335,419.

This invention relates to apparatus for cooling and conditioning grain, and particularly to that type in which the grain moves downwardly by gravity while a counter current of air is passed therethrough.

Apparatus of this type, now in use, will not properly cool and condition grain, such as wheat, corn, oats, barley, rye and seeds, under all conditions. When the grain becomes damp, musty, etc., it has a tendency to hang together and will not flow readily over the fixed baffles or deflectors which are set at a certain angle, thus slowing up the action of the apparatus and ofttimes causing it to become clogged.

The principal object of the present invention is the provision of a conduit having a series of vertically disposed, adjustable baffles adapted to be adjusted to properly handle grain under varying conditions.

Another object is the provision of a cooling and conditioning conduit having a grain seal for the grain inlet and outlet, thereby preventing the escape of the air through said openings.

A further object of this invention is the contemplation of a series of especially constructed and operated baffles for the grain and for the air.

With these general objects in view as well as minor objects which will appear during the course of the detailed specification, reference will now be made to the accompanying drawings in which:

Fig. 3 is longitudinal sectional view taken on line III—III of Fig. 1;

Fig. 4 is a horizontal cross section taken on line IV—IV of Fig. 3;

Fig. 5 is a perspective view of a modified form of the baffle plate; and

Fig. 6 is a perspective view of another modified form of the baffle plate.

Figures 1, 2:
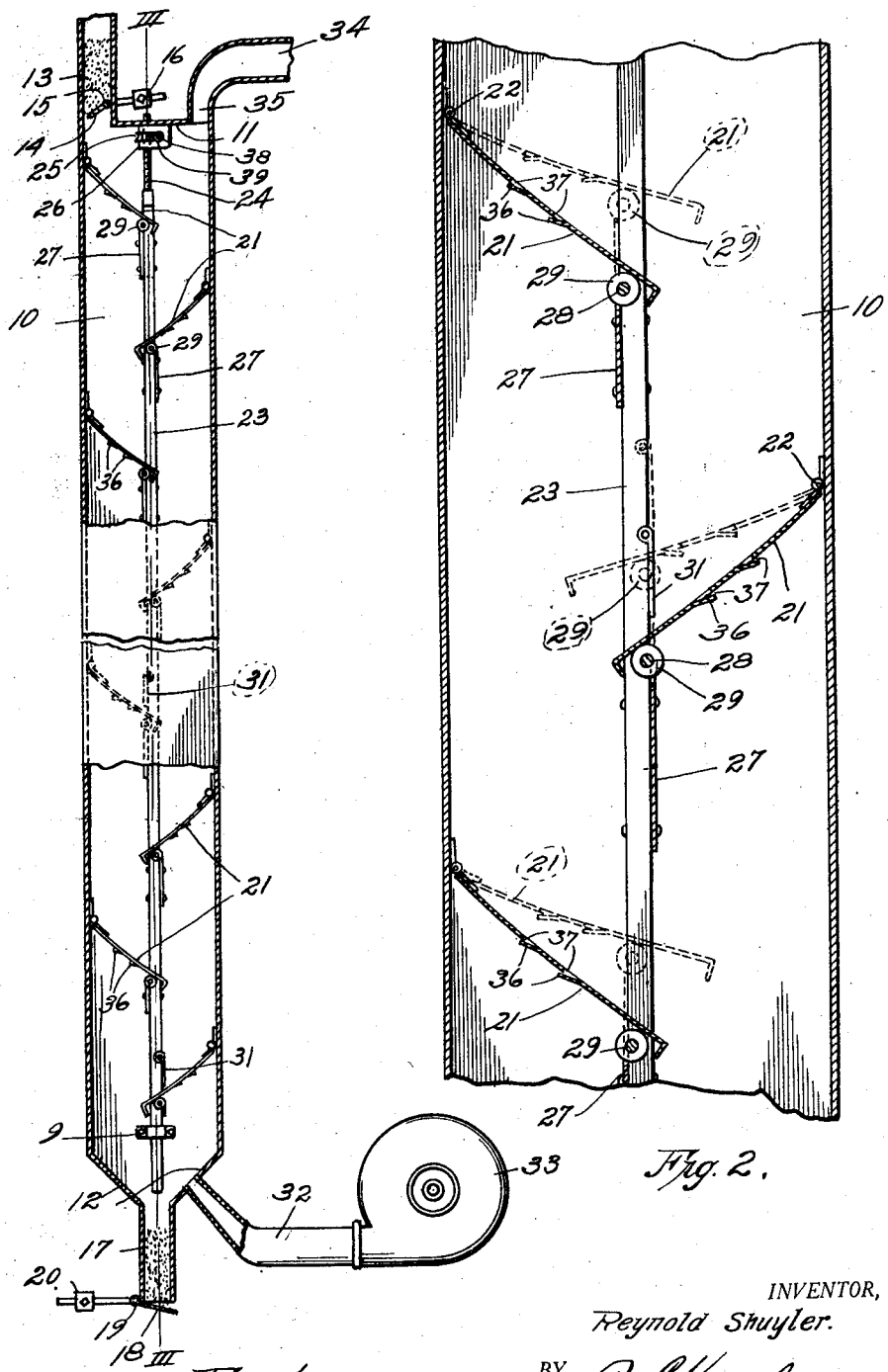
Figure 1 is an elevation partly broken away of grain cooling and conditioning apparatus embodying this invention.
Fig. 2 is an enlarged fragmentary sectional view of a portion of the apparatus.

Similar reference characters designate like parts throughout the several views and the numeral 10 designates a vertically disposed conduit or chute preferably made in rectangular cross sectional form to permit a large quantity of grain to flow therethrough in a relatively thin stream. The conduit 10 may be made of sheet metal, wood, etc. of any desired size or shape to meet the requirements of the cooling and conditioning to be done. Conduit 10 is provided with a closed top 11 and an inclined closed bottom 12. 10 is provided at its upper end with an elongated grain feed pipe 13 communicating with a suitable grain supply and having a gate 14 pivoted at 15 and which is normally held in closed position by means of an adjustable counterpoise 16. When a predetermined amount of grain collects on top of the gate 14 it will be opened sufficiently to permit a thin stream of grain to flow into the chute. The lower end of the chute is provided with a grain outlet 17 having a gate 18 pivoted at 19 and normally held in the closed position by an adjustable counterpoise 20 which, when a predetermined amount of grain is deposited on gate 18, will permit it to open to discharge the grain. By the use of the special grain intake and outlet it is apparent that a grain seal may be maintained for both the inlet and outlet thus facilitating the proper sealing of conduit to prevent the escape of air except through the opening provided therefor. For grains of different weights the counterpoise may be adjusted to vary the amount of weight necessary to cause the gate to open.

The conduit has therein, projecting inwardly from two opposite sides a series of hingedly mounted baffle plates 21 which extend lengthwise, entirely across the conduit and are pivotally connected to their respective walls by means of hinges 22. The baffles 21 are so positioned and spaced apart that a baffle plate on one side of the conduit will project into the space between two baffle plates on the opposite side so that grain admitted through feed pipe 13 will be directed in a zig-zag path by the staggered baffles.

Dry, clean grain will flow freely over the baffles when set at a given angle while damp or musty grain tends to hold together and will not flow freely over the baffles when set at this given angle. Therefore, the baffles must be set at a greater incline to cause the damp or musty grain to flow more rapidly. For the purpose of providing a variable inclination to the baffles, adjustable supporting means for the inner portion of the baffles is provided which consists of a pair of vertically disposed end bars 23 each having a screw threaded upper extension 24 which is in operative relation with rotatably mounted worm gears 25 having a central internal thread 26 adapted to engage the threaded extension 24 to cause the side bars to be adjusted vertically. Each bar 23 is held in central alinement by a strap 9 which fits over the bar and is attached to the end of the conduit. Worm gears 25 are mounted for rotation in bearings 26 which in turn are mounted on conduit 10 and serve to prevent vertical movement of the worm gear, thereby supporting the bars in a predetermined fixed position. For rotating the two worm gears 25 at the same speed, a shaft 38 rotatably mounted in the conduit 10 is provided with worms 39 which operably engage said worm gears. Shaft 38 is driven by means of a pulley 40 rigidly attached thereto. This drive mechanism may be housed to protect it from dust, etc.

A series of vertically disposed baffles 27 are rigidly attached at opposite ends to the bars 23 and extend across the conduit to serve as deflectors to cause the air to pass more directly in the path of the grain. These baffles 27 may be of any suitable width and extend downwardly from their respective adjacent baffle plates 21 and are spaced apart from the baffle plate next below, thereby forming a passageway for the air and grain below the lower edges thereof. Each of the baffles 27 has a rolled upper edge through which passes a rod 28 that serves as a pintle for a series of rollers 29. These rollers are positioned directly beneath the adjacent baffle plate 21 to support the outer portion in any desired position. It will be noted that as the bars 23 are raised and lowered the rollers 29 will contact with the lower portion of adjacent baffle plate 21 which will roll thereon as the bar is operated to change the inclination of the baffle plate. By making the baffles 21 concave, as shown in the preferred form, grain delivered to the upper side of the baffle will start traveling rapidly due to the greater inclination of that portion of the baffle, and as it nears the inner portion of the baffle it will be directed so as to cause it to travel farther across the conduit.

For retarding the flow of the grain and spreading it as it travels through the conduit, aprons 31 are provided. These aprons are hingedly carried by the bars 23, extend entirely across the conduit and are spaced apart from the upper surface of the adjacent baffle 21 to permit a thin stream of grain to pass therebetween. The apron 31 is free to swing away from the grain to permit a larger flow of grain, but when a larger quantity of grain collects at a certain portion of the baffle and the apron is forced out of the vertical position, it will tend to spread the grain over the entire baffle at a uniform depth. Any desired number of aprons 31 may be used.

A suitable supply of air is forced into the conduit at its lower portion through a pipe 32 by means of a fan blower 33. Most of the air passes upwardly around the inner ends of the baffle in a zig-zag path passing through the thin stream of grain above each baffle plate and is then delivered to any suitable collector through the outlet pipe 34 which has an elongated mouth 35 through which it communicates with the conduit 10.

By the falling and rolling action of the grain through the conduit the grains are separated and the must, etc., rubbed therefrom, while at the same time the air passing through the conduit in a counter current passes through the stream of grain at each baffle, picks up the small particles of foreign matter, cools the grain when heated, and generally conditions it to prevent deterioration. The distance between the baffles is such that when the grain falls from one to another it will not be injured or broken by the fall.

The baffles 21 are provided with outwardly and downwardly pressed lips 36 to form slots 37 through which a small quantity of air will pass to insure a better conditioning of the grain. It will be noted that the lips are so formed as not to interfere with the free passage of the grain over the upper surface of the baffle plates.

Fig. 5, which shows a concave baffle plate 21' provided with small perforations 30' through which the grain cannot pass but through which a portion of the air is permitted to travel.

Fig. 6 shows a plain baffle 21'' free from perforations which is suitable for use where the grain is in uniform condition and the air is permitted to flow only between the baffles in the zig-zag path.

In the operation of the apparatus counterpoise 16 is set to permit only a predetermined flow of grain into the conduit and at the same time to maintain a quantity of grain above the gate. The grain thus admitted extends entirely across the conduit in a relatively thin stream and is so maintained by the baffles 21 and aprons 31 during its entire travel therethrough. The baffles are adjusted to the proper inclination to suit the particular class of grain to be conditioned in the manner described above. Counterpoise 20 is also set to maintain a quantity of grain above the gate 18 and at the same time permit the proper flow of grain from the apparatus. In this manner both the grain inlet and outlet are effectually sealed against the escape of air from the conduit. Fan 33 is set in motion and air is forced into conduit 10 through pipe 32, passed in a zag-zag path through the conduit to the outlet 34 where the chaff, dust, etc, may be collected, and conducted to any desired receiver. A portion of the air passes through the slots 30 and through the stream of grain.

It is apparent that a simple and efficient apparatus for cooling and conditioning the grain has been provided which is adjustable to meet the varying conditions of the grain that is encountered in the ordinary elevators. The conduit may be made of any suitable length and cross section to suit the elevator structure. Furthermore with this apparatus the grain may be properly conditioned with only one handling.

I do not wish to limit my invention to the structure shown and described as many modifications may be made within the scope of the appended claims without departing from the spirit thereof.

What I claim is:

1. In an apparatus for conditioning grain, a vertically disposed elongated conduit having a grain inlet and a grain outlet, a series of inclined baffle plates positioned in said conduit to form a zig-zag passageway therein, a spreader apron positioned adjacent and spaced apart from the upper surface of one of said baffle plates and spaced apart from the next baffle thereabove, and means for simultaneously varying the angle of inclination of all of said baffle plates.

2. In an apparatus for conditioning grain, a vertically disposed, elongated conduit having a grain inlet and a grain outlet, a series of inclined, curved baffle plates positioned in said conduit to form a zig-zag passageway therein, a hingedly mounted spreader apron positioned adjacent the upper surface of each of a plurality of said baffle plates, and means for simultaneously varying the angle of inclination of all of said baffle plates.

3. In an apparatus for conditioning grain, a vertically disposed conduit having a grain inlet and a grain outlet, a series of inclined baffle plates located within and projecting inwardly from opposite sides of the conduit to form zig-zag passageway therein, a vertically adjustable bar at opposite ends of said baffles, a vertically disposed baffle plate carried by said bars directly beneath the inner portion of each inclined baffle, the lower edge of said vertical baffles being spaced apart from the next inclined baffle therebelow.

4. In an apparatus for conditioning grain a vertically disposed conduit, a series of adjustable inclined baffle plates projecting inwardly from two opposite sides of said conduit to form a zig-zag passage therein, an apron hingedly mounted above and extending across the inner portion of one of said inclined baffle plates to spread grain passing thereover, and means for adjusting said apron and baffle plate vertically.

In testimony whereof, I hereunto affix my signature.

REYNOLD SHUYLER.